United States Patent

[11] 3,615,590

| [72] | Inventors | Fitzhugh L. Avera<br>Alameda;<br>Frank G. Delfino, Castro Valley; George E. Johnson, Sausalito; Roy L. Kelly, Tarzana, all of Calif. |
|---|---|---|
| [21] | Appl. No. | 677,648 |
| [22] | Filed | Oct. 24, 1967 |
| [45] | Patented | Oct. 26, 1971 |
| [73] | Assignee | CPC International Inc. |

[54] PROCESSES FOR MAKING ROASTED NUT PRODUCTS FROM RAW, BLANCHED NUTS
17 Claims, 1 Drawing Fig.

[52] U.S. Cl. ............................................. 99/128, 99/389
[51] Int. Cl. .............................................. A23l 1/38
[50] Field of Search ............................... 99/65, 128, 126, 287, 389; 165/65

[56] References Cited
UNITED STATES PATENTS

| 2,278,941 | 4/1942 | Musher | 99/126 |
| 1,445,174 | 2/1923 | Rosenfield | 99/128 |
| 2,725,217 | 11/1955 | Hansen | 165/65 X |
| 2,901,225 | 8/1959 | Abrams | 165/65 X |
| 3,019,110 | 1/1962 | Bevarly | 99/128 X |
| 3,044,883 | 7/1962 | Ferguson | 99/128 |
| 3,121,015 | 2/1964 | Avera | 99/128 |
| 3,215,192 | 11/1965 | Sollick | 165/65 X |
| 3,246,991 | 4/1966 | Avera | 99/128 |
| 3,265,507 | 8/1966 | Japikse | 99/128 |
| 3,317,325 | 5/1967 | Durst | 99/126 |
| 3,346,390 | 10/1967 | Pichel | 99/128 X |
| 3,397,997 | 8/1968 | Japikse | 99/128 |

OTHER REFERENCES
Peanut Journal, Feb. 1952, pg. 23.

*Primary Examiner*—Frank W. Lutter
*Assistant Examiner*—Robert Halper
*Attorneys*—Frank E. Robbins, James L. Bailey, Janet E. Price, Robert D. Weist and Martha A. Michaels

ABSTRACT: This application covers a nut butter that is characterized by full-bodied roast flavor of enhanced intrinsic uniformity and that possesses enhanced flavor and aroma, and that is characterized by enhanced freedom from heat and oxidative deterioration. The process involves grinding shelled, raw, blanched nuts to form a slurry, passing the slurry through a confined zone such as a tubular heat exchanger, heating the slurry to roast it and then cooling it within the heat exchanger, and recovering the product. The moisture content of the slurry, and the pressure and temperature within the tubular heat exchanger, may be controlled so that the product that is recovered from the heat exchanger may be solid comprising a dispersion of oil in agglomerated particles of nut solids. This can be consumed as such, or coated with candy coatings such as chocolate, or it may be subjected to mixing or shearing to convert it to the butter product.

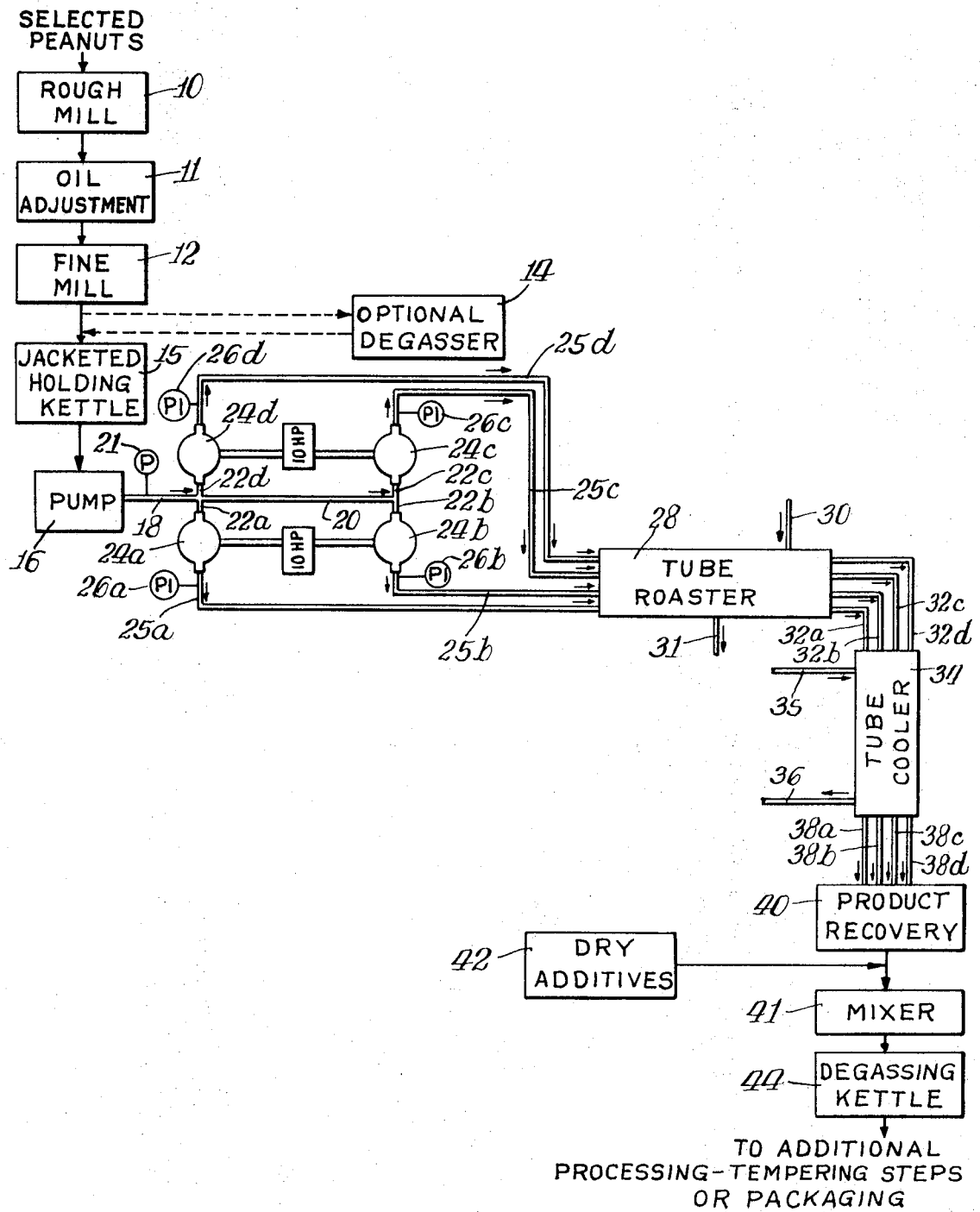

PROCESSES FOR MAKING ROASTED NUT PRODUCTS FROM RAW, BLANCHED NUTS

This invention relates to a novel nut butter product, and to processes for making the novel product.

In U.S. Pat. No. 3,121,015, granted Feb. 11, 1964, to Fitzhugh L. Avera, and assigned to Corn Products Company, a process is described for making an improved peanut butter having full-bodied roast flavor of enhanced intrinsic uniformity, and containing ground peanuts that are substantially free from under- and over-roasted flavors, and possessing enhanced freedom from heat and oxidative deterioration. This product was prepared by grinding substantially dehydrated raw peanuts to a fluid slurry, and roasting the slurry. A preferred roasting technique used the simple method of placing the slurry in a jacketed kettle, stirring, and subjecting the slurry to roasting temperature. After roasting, the roasted slurry was cooled.

One of the preferred pieces of equipment for carrying out the roasting was a heat exchanger of the scraped wall type. Other heated, agitated vessels of the open type could also be used. In all such pieces of equipment, however, the peanut slurry was exposed, at elevated temperatures, to intimate contact with the air, because of the agitation that continuously took place during roasting, in order to effect good heat exchange. Unfortunately, this exposure to an intimate contact with the atmosphere, at roasting temperatures, necessarily involved the loss of volatile flavor and aroma components.

One object of the present invention is to provide a new nut butter that is characterized by full-bodied roast flavor, of enhanced intrinsic uniformity, free from under- and over-roasted flavors, and having enhanced flavor and aroma, and enhanced freedom from heat and oxidative deterioration, particularly as compared to a product of whole or split nut roasting.

A related object of the invention is to provide a peanut butter having the characteristics described.

Another object of the invention is to provide a practical process for producing nut butter products of the character described.

Still another object of the invention is to provide new kinds of nut butter products, and particularly, peanut butter products.

Other objects of the invention will be apparent hereinafter from the specification and from the recital of the appended claims.

The single figure of drawing is a schematic diagram showing the steps involved in preparing a peanut butter product in accordance with one preferred embodiment of the invention, and one way in which the confined zone heat exchanger can be arranged, for the practice of the invention in accordance with one preferred embodiment thereof.

The process of the present invention can be used for making several different nut butter products. However, the product for which the process will find the greatest application is peanut butter. The invention will be described, therefore, primarily in terms of the manufacture of peanut butter products.

The process involves grinding shelled, raw, blanched peanuts, that are substantially free of testa, to form a slurry. This slurry is then passed, as a continuous stream, through a confined, elongated treating zone. The slurry is heated in a first section of this zone, to roast it. While the slurry is still confined within the treating zone, it is then cooled, and then is discharged for recovery as a product or for further processing.

There are several refinements that can be made in the process as just described, depending upon the characteristics of the nuts being processed, and the desired end product. For example, in order to make a satisfactory peanut butter, it is desirable to add to the slurry, prior to roasting, a material that functions as a stabilizer, to prevent gravitational oil stratification in the peanut butter product. It is also desirable, for the production of good peanut butter, to reduce the moisture content of the slurry to or below about 2 percent by weight before roasting it in the confined zone heat exchanger. Also, the oil content of the slurry can be adjusted, either by extracting some of the oil, or by adding additional oil. Other refinements will appear from the more detailed description of the process of the invention, that follows.

It is possible to control the moisture content of the slurry, and the temperature and pressure during roasting and cooling of the slurry, so as to permit the recovering, from the heat exchanger, of either a conventional peanut butter product or of a solid or semisolid product comprising peanut oil dispersed in agglomerated peanut solids. This semisolid or solid product may be in the form of powder, pellets, or cakes, each of which can be converted to peanut butter by mixing, shearing, or otherwise agitating. The solid product is useful in its own right for direct consumption, especially if coated with a candy coating such as, for example, a chocolate coating.

The apparatus for practicing the process, and producing the products of the invention, includes as one important feature thereof a confined treating zone, and means for heating the slurry stream in the zone to roast it, and means for cooling the slurry while still within the confined zone, in order to permit the recovery of a product at a temperature at which degradation of the product is reduced. In a preferred mode, this is provided by series-connected tubular heat exchangers, one for roasting and one for cooling, with an individual pump for each tube. However, any system may be used that provides for even and positive flow through each tube.

The peanuts, that are selected for processing in accordance with the invention, are preferably partially dried to a moisture content of 5 percent or less, preferably 2 percent or less, prior to use. This can be accomplished, for example, by heating at a temperature in the range from about 200° F. to about 290° F., or preferably, from about 200° F. to about 245° F. The preliminary drying step is an optional step that may be valuable for some operating conditions, but that may be omitted in favor of a moisture reduction at a later stage in the process, if desired. For preliminary drying, the traditional peanut roaster may be used. It is also possible to use vacuum in a heated drying chamber, to bring the peanuts to a low, uniform moisture content. Any suitable means for the reduction and equilibration of the moisture content may be used.

The process of the invention will be described in greater detail in connection with the drawing. Referring now in detail to the drawing by numerals of reference, selected peanuts are fed into a rough mill 10. One preferred method, for selecting the peanuts, is to use an electronic scanning device, that observes incoming peanuts against a reference color background, and removing those nuts that are dark brown and that therefore are probably damaged. This can be supplemented by a manual picking operation.

The slurry from the initial or rough mill 10 is then processed to adjust its oil content. Ordinarily, this involves a removal of some of the oil and its replacement with a lightly hydrogenated oil, in substantially equivalent amount. The lightly hydrogenated or hardened oil functions as a stabilizer, to prevent gravitational oil stratification in the final peanut butter product. Ordinarily, the initial grinding of the peanuts raises the temperature to about 160° F., so that the lightly hydrogenated oil is a fluid of low viscosity at the temperatures at which the slurry is processed. The oil adjustment operation is indicated in the drawing by the numeral 11. The amount of oil in the slurry is preferably substantially equal to the amount of nonoleaginous solids, by weight.

The slurry is next passed through a fine mill 12, that grinds the solids to a sufficiently small size to make a smooth product. It is preferably ground so that at least 96 percent will pass through a standard U.S. sieve of 200 mesh size.

The resulting slurry preferably is next passed through a degasser 14. The function of the degasser 14 is to remove gases that are dissolved or entrained in the slurry. Any kind of equipment that degasses the peanut butter can be employed. For example, the degassing equipment may be a rotating drum in which a sufficiently high vacuum can be maintained to remove entrained or dissolved air. The rotating drum can be equipped, if desired, with a blade or rotor for attenuating the slurry along the inner wall of the drum, in the form of a thin film. However, as indicated in the drawing, the degasser 14 is optional. The degassing can be performed, in an alternative mode, by operating the grinding equipment under vacuum.

The slurry is next delivered into a jacketed holding kettle 15. The jacket of this holding kettle may be supplied with hot water or other heat exchange medium at a temperature so that, upon discharge, the slurry has a temperature in the neighborhood of about 180° F. This discharge temperature may have any value at which the slurry is sufficiently fluid to flow readily to the next piece of equipment. It is preferred that the slurry be mildly agitated in the holding kettle, in order to keep the suspension uniform.

The holding kettle is equipped with a bottom drain line that connects to the inlet of a positive-acting pump 16 that is equipped with its own motor. The pump 16 delivers the slurry through a line 18 into a manifold 20. In an alternate mode, the pump 16 may be omitted in favor of reliance upon hydrostatic head pressure achieved by gravitational forces developed by elevational differences. It is preferred that the line 18 be equipped with a pressure gauge 21, to permit the operator to observe the performance of the pump 16.

In an alternative mode, the line 18 may also be equipped with a means for admitting metered atmospheric air immediately prior in time to roasting, during the roasting cycle, for enhancing that portion of the flavor development during roasting which may require oxygen during the flavor development reaction.

For commercial operations, the roaster and cooler, through which the slurry is next passed, are preferably formed of a pair of serially connected tubular heat exchangers, each having the same number of tubes. For desired capacity, multitube heat exchangers, having as many tubes as required, are ordinarily employed. For simplicity in illustrating and describing the invention, only four tubes are shown in the drawing and are described hereafter. However, the mechanical arrangement is essentially the same, regardless of the number of tubes.

The manifold 20 is connected to four outlets 22a, 22b, 22c, and 22d, respectively. These lines in turn communicate with the inlets of four positive-acting pumps, preferably piston pumps, 24a, 24b, 24c, and 24d, respectively. These pumps discharge through lines 25a, 25b, 25c, and 25d, respectively. These four lines are equipped respectively with pressure gauges 26a, 26b, 26c, and 26d. The four discharge lines 25a, 25b, 25c, and 25d, are connected to the inlet ends of tubes of a multiple tube heat exchanger 28. This heat exchanger is provided, in the usual manner, with a steam supply line 30, through which steam is supplied to the exchanger to heat the slurry passing through the tubes. It is also provided with a condensate drain line 31.

The discharge ends of the tubes of the heat exchanger 28 are connected through lines 32a, 32b, 32c, and 32d, respectively, with the inlet ends of the tubes of a second heat exchanger 34. This heat exchanger is provided with an inlet line 35, for supplying cooling water to the exchanger, and with a discharge line 36 for draining the cooling water from the exchanger. The heat exchanger 34 is connected to four discharge lines 38a, 38b, 38c, and 38d, respectively. These lines discharge into a product recovery receiver 40. The nature of this receiver 40 will depend upon the kind of product for which the system is designed and is being operated. If the equipment is being operated so that the material discharged from the tubular heat exchanger is peanut butter, then the receiver 40 is a degassing means. In this case, after degassing, the peanut butter is transferred to a mixer 41, together with dry additives from a supply bin 42. If the optional degasser 14 has been used, then it may not be necessary to use a degasser to process the material discharged from the tubular heat exchangers. However, if the optional degasser 14 has not been used, it is preferred that a degasser be used to process the material from the tubular heat exchangers. This degasser can also be used to remove excessive moisture from the product, and thereby enhance flavor stability.

A degassing kettle 44 is disposed to receive material from the mixer 41, to take out air that has become entrained in the peanut butter product during the blending of the dry additives. The material from the degassing kettle 44 is transferred to additional prepackaging processing-tempering steps, or direct to packaging operations.

In an exemplary operation of the equipment for the direct production of peanut butter, selected peanuts are ground in the rough mill 10. A portion of the oil is removed and replaced with slightly hydrogenated oil. The resulting slurry is then passed through the fine mill 12, so that the peanut solids are finely ground. The milling operations raise the temperature of the slurry, and it is maintained by employing steam-jacketed lines wherever possible. The slurry is fed into a jacketed holding kettle 15, in which the temperature is maintained at or raised sufficiently high to provide adequate fluidity for flow into the pump 16, such as, for example, a temperature of about 180° F.

The warm slurry from the holding kettle 15 flows down and is drawn down into the pump 16, which forces it through the discharge line 18 into the manifold 20. The four piston pumps 24a, 24b, 24c, and 24d are positively fed slurry by the pump 16, and each of these four piston pumps in turn forces a stream of slurry first through the tube roaster 28, then through the cooling heat exchanger 34. Each of the four piston pumps 24a, 24b, 24c, and 24d is individually adjustable by the operator, so that each forces slurry through the heat exchangers at substantially the same rate. The pressures are indicated by the four respective pressure gauges, 26a, 26b, 26c, and 26d.

Steam is supplied to the jacket of the heat exchanger or tube roaster 28 at an elevated pressure, to raise the temperature of the several streams of slurry, to roast the slurry. Depending upon the rate of flow and the dimensions of the confined, tubular roasting zones, the temperature should be somewhere in the range between about 280° F. and about 350° F. The development of roast flavor is a time-temperature phenomenon, so that a change in temperature ordinarily requires a change in exposure time, for the development of a given flavor. One preferred roasting temperature is 330° F. The roasted slurry streams pass directly from the tube roaster 28 into a second heat exchanger or tube cooler 34, in which a jacket of water at about 85° F. cools the slurry to a temperature in the range from about 140° F. to about 160° F. The roasting and cooling are effected while the slurry is confined, and with adequate agitation arising from the flow, so that there is a minimum of opportunity for the escape of flavor and aroma components and for oxidative deterioration.

When the initial moisture content of the slurry is at or below about 2 percent, and the slurry remains reasonably fluid and pumpable during its passage through the tubes, the product that is discharged from the tube cooler is a peanut butter. In order to complete the production of the peanut butter, to make a packageable product, it is degassed in the receiver 40, and then dry additives are added from the supply bin 42, and mixed with the peanut butter in the mixer 41. The dry additives include such items, for example, as salt, sugar, and the like. The peanut butter mixture is then passed through a degassing kettle 44, in which entrained air is removed. The degassed peanut butter from the kettle 44 is then ready for packaging operations.

There are several available techniques for modifying the process in order to obtain a product from the tube cooler that is solid or semisolid in nature, and that comprises peanut oil dispersed in agglomerated peanut solids. For example, when the peanut slurry has a moisture content in the range from about 2 percent to about 10 percent, the slurry tends to be very thick. It can be pumped only with difficulty. Its viscosity causes a pressure buildup as it is moved through the tubular heat exchangers. The combination of increased pressure and increased moisture content, together with the high roasting temperatures, cause agglomeration of the nonoleaginous peanut solids of the slurry, so that the product that is discharged from the tubular heat exchangers is solid or semisolid. Depending upon conditions during processing, that become apparent and easily controllable by the operator with experience with a particular slurry and particular equipment, the product may be either powder, pellets, or larger masses that can be aptly described as cakes. In some cases the product tends to be cohesive and forms long strings, similar in appearance to large pieces of spaghetti.

The solid product is edible, and has a good peanut flavor. It may be consumed as such, or it may be used as an ingredient in preparing other foods such as, for example, cakes and cookies. It can also be used in the manufacture of confections, and the larger pieces are delicious coated with a chocolate coating.

In order to convert the solid product to peanut butter, it is passed directly from the tubular heat exchangers into a receiver 40 in which it is subjected to agitation, either mixing or shearing. This causes the solid product to convert to a material of typical peanut butter consistency, in which the solids are suspended in oil. For mixing or shearing, the receiver 40 may comprise an attrition mill will grinding plates set further apart than is normal for grinding operations.

Roasting and cooling the slurry is confined tubes not only prevents the escape of aroma and flavor components of a volatile nature, but also prevents oxidation of the oils per se. Excess air is excluded during roasting. The process and equipment are extremely simple yet effective for the performance of their desired functions.

For effective heat exchange in the tube roaster and tube cooler, the diameter of the bore of each tube should be in the range from about one-eight inch to about three-eights inch. Naturally each tube in a particular tube bundle, in a given heat exchanger, should be the same size as every other tube through which the slurry is passed. The use of one pump for each tube insures positive flow in each tube. Moreover, when each pump is adjustable, substantially the same roast flavor development can be attained, by appropriate adjustment of the time-temperature relationship for each tube. While the apparatus illustrated in the drawing relies upon manual adjustment by an operator, in response to observed pressure readings, it is possible to use many other different techniques for obtaining uniformity of slurry flow. For example, thermocouples can be disposed in the tubes or on the tube surfaces, respectively, and servo controls responsive to the thermocouples can be employed to make needed adjustments to each pump individually. This kind of arrangement is more highly automated and avoids reliance upon manual adjustments and operator observations.

The use of small diameter tubes for heating and cooling is a simple mechanical way to provide substantially uniform cross-sectional heating of each slurry stream. Moreover, the capital cost is relatively low in terms of the available throughput capacity. While the use of two series-connected tubular heat exchangers, the first for roasting, the second for cooling, represents a preferred embodiment of the invention, other means may be used. For example, the cooling step can be effected in a scraped wall heat exchanger of the kind in common use in the food industry, provided that it is constructed and operated to provide confined zone heat exchange (cooling), so that aroma and flavor components cannot escape from the slurry during the roasting and cooling steps. In addition, of course, the slurry must be maintained in its confined state during its passage between the heating and cooling steps.

While ordinarily a high-moisture slurry will be employed where it is desired to produce a solid product at the discharge of the tube cooler, low-moisture content slurries can also be employed to produce solid products where the pressure and temperature within the tubular heat exchangers are adjusted to cause the desired result. Generally, high temperatures and pressures tend to produce a solid product, as does a higher moisture content.

The preferred solid and peanut butter products ordinarily contain approximately equal amounts, by weight, or nonoleaginous solids and peanut oils. The solid product, when produced, has unusual characteristics. The solid particles appear to be cross-linked.

One of the characteristics of the process of this invention is that there is substantially no escape of volatile materials from the slurry during roasting. For example, when the slurry in the holding kettle 15 has a moisture content of 2 percent, the product entering the product recovery receiver 40 ordinarily has the same moisture content of 2 percent.

In order to produce fine peanut butters, it is ordinarily preferred to add a gravitational stabilizer prior to roasting, either with or without the removal of some of the oil, depending upon the stabilizer selected. However, the process is applicable to peanut butters of all types, including old-fashioned peanut butter, in which stabilizers are not used. Any compatible high melting fat component may be used as the stabilizer. Such a component usually has a melting point in excess of 110° F. but less then 160° F. and may be: a partially hydrogenated fat, a completely hydrogenated fat, mono- (and di-) glyceride esters of the saturated fatty acids, or mixtures of these firming-up agents. These high-melting fat components, when added in small amounts (viz. 1–3 percent of the peanut butter), may be introduced as a supplement to the ground roasted peanuts or when added in larger amounts (viz. 5–10 percent of the peanut butter) may be introduced after an equivalent amount of the liquid peanut oil in the ground roasted peanuts had been removed. The added hard fat sets up as a continuous or semicontinuous stearine structure within the final peanut butter during the cooling of the product and in so doing prevents oil from separating from the peanut butter. The sugar and salt flavorings are added in peanut butter manufacture in total amount usually less than 5 percent, and this addition is balanced with an equivalent addition by weight of liquid nonhydrogenated vegetable oil, or the firming-up agent previously mentioned. When the latter approach is used, less of the native peanut oil has to be removed to compensate for the subsequent addition of the hard fat component.

It is ordinarily preferred to reduce the moisture content of the slurry to about 2 percent or less, and this may be done at the receiver 40, operating as a degassing means, although it may also be done prior to roasting. In addition, while it is preferred that at least 96 percent of the peanut solids in the slurry be below 200 mesh screen size, any particle size that will produce a slurry of ordinary peanut butter consistency can be used.

Moreover, the process of this invention can also be applied to the production of chunk-style nut butter such as peanut butter. This can be accomplished, for example, by adding the nut chunks to the jacketed holding kettle 15, in the proper proportion. The chunks of raw peanuts which are added are prepared, for example, by chopping or granulating the raw blanched peanuts to a predetermined size e.g., such as presently used in chunk-style peanut butter. Chunks which will pass through a standard U.S. No. 4 mesh screen (4,760 microns) and be retained on a standard U.S. No. 6 mesh screen (3,360 microns) are satisfactory, although other sizes may be used. These chunks, in the desired amount, which is usually about 12 percent of the total weight of the chunk-style peanut butter, are added to the slurry, and the mixture of the two is subjected to treatment to develop the desired degree of peanut flavor in the combined mass and to complete the roast of the same, by processing in accordance with the present invention substantially in the manner already described. The chunks may have a moisture content that is substantially the same as that of the slurry, or a different moisture content.

For example, chunk moisture contents in the range from about 1 percent to about 9 percent may be used, and higher and lower moisture contents are operable, although it is preferred that both the chunks and the slurry have substantially the same moisture content, to facilitate control of the process. Preferably, all of the peanuts used in the process are subjected to a preliminary drying operation, to reduce and to equilibrate their moisture contents to a value below 5 percent, and preferably below 2 percent. The partially dried peanuts can then be separated for subsequent processing by grinding or for chunks, in appropriate proportions.

The peanut butter products that are produced by this invention are characterized by full-bodied roast flavor of enhanced intrinsic uniformity, since roasting is effected under conditions that are conducive to uniformity. The peanut butters also have enhanced flavor and aroma, and enhanced freedom from heat and oxidative deterioration, particularly as compared to a product obtained by whole or split nut roasting.

While the foregoing description has been particularly concerned with the production of peanut butters, the same process can be used for making nut butter products from many different kinds of nuts, including, for example, cashew nuts, walnuts, and other popular nuts that are ordinarily used in making nut butter products.

The fine product characteristics are believed to be attributable to the elimination of gross thermal and moisture gradients during roasting; the elimination of exposure of the product to the atmosphere at high temperatures after roasting; and the maintenance of intimate contact between the oil and dispersed solids during roasting, in the absence of free atmosphere. These and other features of the process of this invention develop the highest nut flavor attainable in the product, and produce products of greatly increased shelf life as measured organoleptically and chemically.

The apparatus of the invention is primarily intended for the processing of nut products. However, it is of general applicability to the heat treatment of plastic materials, particularly food materials, such as, for example, the treatment of thick, sugar-rich batches of material for the manufacture of caramel candy and taffy. It is particularly valuable for the heat treatment of temperature-sensitive materials that require heat treatment to effect a desired change.

While the invention has been described in connection with specific embodiments thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A process for roasting nuts, comprising:
comminuting shelled, raw, blanched nuts to form a slurry:
passing a stream of said slurry under positive pressure through a confined, substantially unobstructed tubular heat exchange zone having a cross-sectional area equivalent to the internal cross-sectional area of a cylindrical tube having an internal diameter in the range from about one-eight of an inch to about three-eights of an inch;
heating the slurry during its passage through said zone, to roast it, then
cooling the slurry during its passage through a second, sequential portion of said zone, and
recovering a roasted nut product.

2. A process in accordance with claim 1, including:
adding to said slurry, prior to its passage through said zone, chunks of raw, blanched nuts.

3. A process in accordance with claim 1 wherein the nuts are peanuts.

4. A continuous process for manufacturing a nut product, comprising:
comminuting shelled, raw, blanched nuts to form a slurry;
passing at least one stream of said slurry through a continuous, confined heat exchange zone, there being a separate zone for each stream, respectively;
applying positive pressure to each said stream individually, to cause it to pass through its respective heat exchange zone;
heating each stream during its passage through a first portion of said zone, to roast the slurry, then
cooling each stream of the roasted slurry during its subsequent passage through a second, sequential portion of the same, confined zone, and
recovering a roasted nut product.

5. A process in accordance with claim 4, including:
comminuting the nuts so that at least 96 percent of the particles of nut solids in the slurry are below 200 mesh sieve size.

6. A process in accordance with claim 4, including:
adding to said slurry, prior to its passage through the confined zone, chunks of raw, blanched nuts.

7. A process in accordance with claim 4, including, as a preliminary step, subjecting the nuts to a treatment to reduce and to equilibrate the moisture content thereof.

8. A process in accordance with claim 4, including:
individually adjusting the pressure pressure applied to each stream for passage through its respective zone, to achieve substantially the same rate of flow through each zone.

9. A process in accordance with claim 4, including:
adjusting the oil content of the slurry, following comminuting, to be substantially equal in parts by weight to the nonoleaginous content of the slurry.

10. A process in accordance with claim 9, wherein the heat exchange zone for each said slurry stream has a cross-sectional area that is equivalent to the internal area of a cylindrical tube having an internal diameter in the range from about one-eight of an inch to about three-eights of an inch.

11. A process in accordance with claim 10, including:
heating the slurry to a roasting temperature in the range from about 280° F. to about 350° F.

12. A process in accordance with claim 11, including:
cooling the roasted slurry in the second portion of said zone to a temperature in the range from about 140° F. to about 160° F.

13. A continuous process for manufacturing a peanut product, comprising:
partially drying shelled, raw, blanched, substantially testa-free peanuts to reduce their moisture content to not in excess of 5 percent by weight;
grinding the partially dried peanuts to form a slurry in which at least 96 percent of the particles of solids are below 200 mesh screen size, then
pumping at least one stream of the slurry through a confined, elongate, substantially unobstructed tubular heat exchanger that has a cross-sectional area equivalent to the internal cross-sectional area of a cylindrical tube having an internal diameter in the range from about one-eight of an inch to about three-eights of an inch, there being a separate heat exchanger for each stream, respectively;
applying positive pressure to each said stream individually, to cause it to pass through its respective heat exchange zone;
heating each slurry stream during its passage through a first section of the heat exchanger, to roast it, then
cooling each stream of the roasted slurry during its subsequent passage through a second, sequential section of the heat exchanger, and
recovering a roasted nut product.

14. A process in accordance with claim 13, including:
heating the slurry to a roasting temperature in the range from about 280° F. to about 350° F. and
cooling the roasted slurry in the second portion of the heat exchanger to a temperature in the range from about 140° F. to about 160° F.

15. A process in accordance with claim 14, including:
recovering from the cooling zone a fluid peanut butter product.

16. A process in accordance with claim 14, including:
maintaining the pressure in said heat exchanger so as to permit the recovery from said zone of a solid peanut product comprising oil dispersed in agglomerated, nonoleaginous, finely divided peanut solids.

17. A process in accordance with claim 16, including the added step of subjecting the solid peanut product to shear to convert it to a suspension of nonoleaginous solids in oil.